Patented June 24, 1930

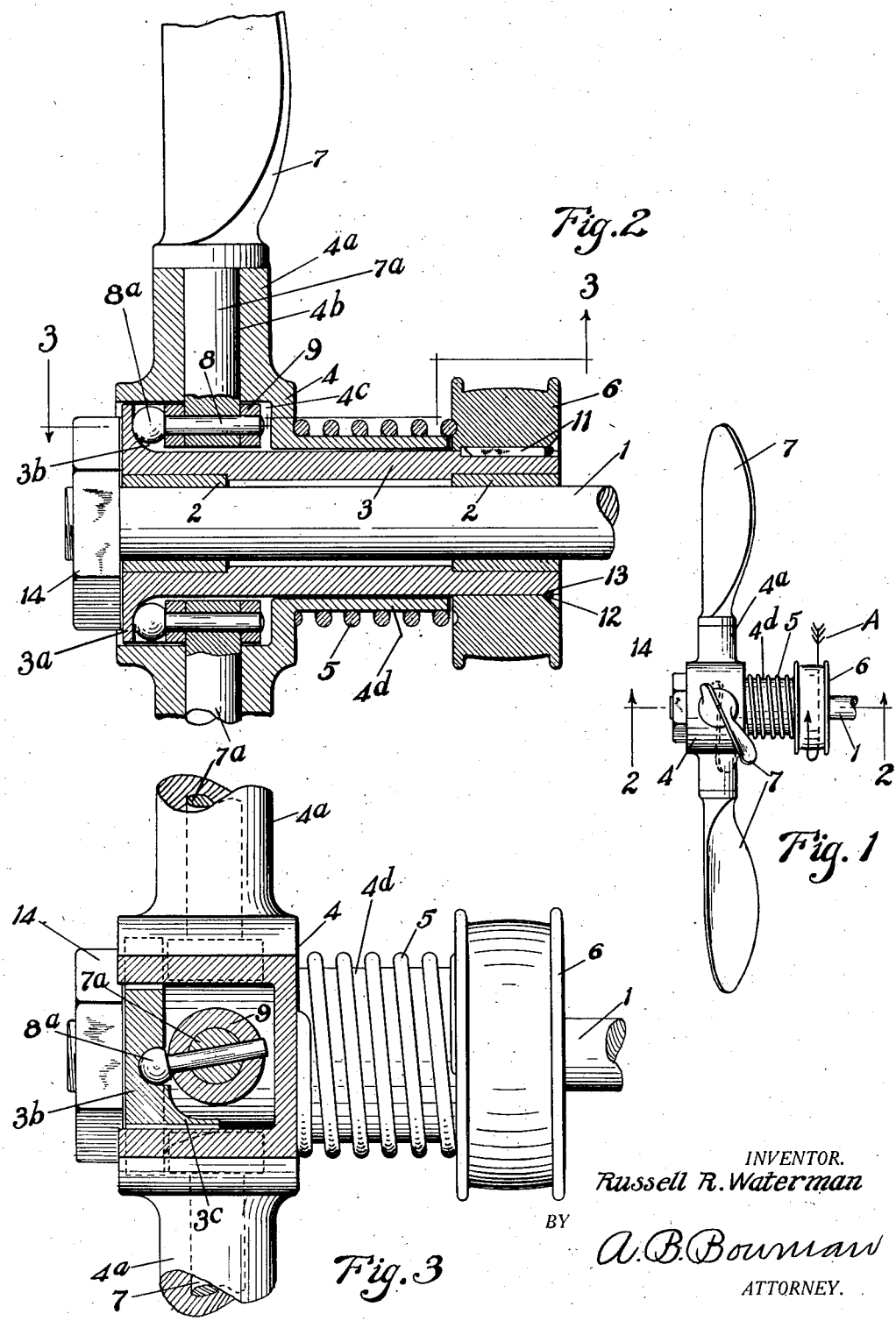

1,767,027

UNITED STATES PATENT OFFICE

RUSSELL R. WATERMAN, OF LONG BEACH, CALIFORNIA, ASSIGNOR TO FARMERS' NATIONAL BANK OF GREENVILLE, OHIO, TRUSTEE, OF GREENVILLE, OHIO, A CORPORATION OF OHIO

COOLING-FAN MECHANISM

Application filed June 7, 1926. Serial No. 114,294.

My invention relates to a fan mechanism for automotive or other purposes. In cooling fans of this class, the fans are usually driven direct from the motor or engine causing the speed of the fan rotation to vary as the engine speed varies, resulting in different air velocities through the radiator or condenser.

The objects of my invention are, therefore; first, to provide a cooling fan mechanism so constructed as to maintain a more constant air velocity; second, to provide a cooling fan mechanism so constructed that the pitch of the fan blades are controlled by the torque or fan load; third, to provide a novel fan mechanism of this class; and, fourth, to provide a cooling fan mechanism which is very simple and economical of construction, easy to install and remove, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my cooling fan mechanism; Fig. 2 is a sectional view taken on the line 2—2 of Fig. 1, and Fig. 3 is a sectional view taken on line 3—3 of Fig. 3.

Similar characters of reference refer to similar parts and portions throughout the different views of the drawings.

The shaft 1, bushings 2, sleeve 3, hub 4, spring 5, pulley 6, fan blades 7 and pin 8 constitute the principal parts and portions of my cooling fan mechanism.

The shaft 1 is mounted on the engine in the conventional manner for fan shafts. Around the shaft and supported thereon by the bushings 2 is the sleeve 3. A flange $3^a$ is integrally formed around one end of the sleeve 3 which flange is provided with recesses $3^b$ in which are loosely mounted the heads $8^a$ of the pins 8. Revolubly mounted on the sleeve 3 and covering the greater part of its length is the hub 4 which extends to cover the flange $3^a$. Extending from the periphery of this hub and at any convenient distance apart are a plurality of bosses $4^a$ which have bores $4^b$ opening through them into a recess $4^c$ on the inside of the hub 4.

The fan blades 7 are of the conventional shape except that the inner ends are provided with a reduced portion $7^a$ which serve as shafts for the blades. These shafts are rotatably mounted in the bores $4^b$ and are retained in the bores $4^b$ by collars 9 which are positioned on the ends of the shafts $7^a$. Passing through the collars 9 and through the ends of the shafts $7^a$, and holding the collars in place thereon, are the pins 8. Lugs $3^c$ integrally a part of flange $3^a$ are positioned immediately back of each of the recesses $3^b$. The collars 9 engage these lugs, thus preventing the fan blades 7 from passing the center line.

The pulley 6 is mounted on one end of the sleeve 3 and drives the sleeve through a key 11. A spring ring 12 snapped into place in the groove 13 which is provided around the end of sleeve 3 prevents the pulley from slipping off of the sleeve and also prevents loss of key 11.

A spring 5 is placed around a reduced portion $4^d$ of the hub 4, the one end of the spring thrusting against the pulley 6 and the other end thrusting against a flange portion or shoulder at the opposite end of the reduced portion $4^d$ of the hub 4. A nut 14 is placed on the end of the shaft 1 for holding the cooling fan thereon.

The operation is as follows: when the engine or motor is started the pulley 6 revolves in the direction indicated by arrow A, Fig. 1. This direction of motion is carried through the key 11 to the sleeve 3, through the sleeve 3 to the flange $3^a$, through the flange $3^a$ by means of the walls of the recesses $3^b$ to the pins 8, through the pins 8 to the shafts $7^a$, through shafts $7^a$ to fan blades 7 which thus engage the air simultaneously as a complete fan. Though it operates as a complete fan, the fan blade shafts 7ª, being mounted rotatably in the boss 4ª assumes various pitches according to the speed of the fan and the resulting increase or decrease of the fan load. When the engine is at great speed, the fan is necessarily at a great speed also, with a corresponding increase of fan load, this increase of the fan load overcoming the thrust of the spring 5 and forcing the fan blade to assume the approximate pitch shown by dotted lines in Fig. 1. Intermediate speeds of the engine will result in intermediate pitches of the fan blades, thus keeping the air at approximately the same velocity through the radiator or condenser.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a cooling fan mechanism, a shaft, a sleeve revolubly mounted thereon, a drive pulley secured to said sleeve, a hub member revolubly mounted on said sleeve, a plurality of fan blades rotatably mounted in said hub, and means secured to said fan blades engaging said sleeve for rotating said fan blades in said hub with varying loads on said fan blades.

2. In a cooling fan mechanism, a revoluble member, recesses therein, a hub revolubly mounted relatively to said revoluble member, a plurality of fan blades rotatably mounted in said hub member and means for feathering said fan blades in said hub member dependent upon the pressure on said fan blades, consisting of a pin secured in the axle of said fan blades provided with a head engaging said recesses in said revoluble member, and a thrust spring tending to hold said hub against relative movement of the hub member to said revoluble member.

3. In a cooling fan mechanism, a shaft, a sleeve revolubly mounted thereon provided with a flange in its extended end with recesses in said flange, a drive pulley secured to said sleeve, a hub member provided with a recess revolubly mounted on said sleeve, a plurality of fan blades rotatably mounted in said hub provided with shafts extending into said recess in said hub member, pins secured in said shafts with heads extending into said recesses in said flange, and a thrust spring positioned between said hub member and said pulley tending to force said hub member toward said sleeve flange.

4. In a cooling fan mechanism, a shaft, a sleeve revolubly mounted thereon provided with a flange in its extended end with recesses in said flange, a drive pulley secured to said sleeve, a hub member provided with a recess revolubly mounted on said sleeve, a plurality of fan blades rotatably mounted in said hub provided with shafts extending into said recess in said hub member, pins secured in said shafts with heads extending into said recesses in said flange, and a thrust spring positioned between said hub member and said pulley tending to force said hub member toward said sleeve flange, a sleeve positioned around said fan blade shafts and supported by said pins adapted to engage stop means on said sleeve to prevent too great a revolution of said fan blades.

5. In a cooling fan mechanism, a revoluble member, a hub revolubly mounted relative to the revoluble member, a plurality of fan blades rotatably mounted in said hub member, and means for feathering said fan blades in said hub member dependent upon the pressure on said fan blades, said means consisting of pins secured at the inner ends of the pivotal portions of the blades, and recess means in the hub member into which said pins extend, said fan blades being rotatable about their rotatable axes when the hub member is rotated relative to the revoluble member, and a spring for holding the hub against relative movement to the revoluble member.

In testimony whereof, I have hereunto set my hand at Los Angeles, California, this 25th day of May, 1926.

RUSSELL R. WATERMAN.